United States Patent [19]

Pegram

[11] Patent Number: 4,517,408
[45] Date of Patent: May 14, 1985

[54] SELF-CENTERING CABLE FASTENER

[75] Inventor: Warren J. Pegram, Greensboro, N.C.

[73] Assignee: AMP Incorporated, Harrisburg, Pa.

[21] Appl. No.: 517,593

[22] Filed: Jul. 27, 1983

[51] Int. Cl.³ .......................... H01B 17/26; F16L 5/00
[52] U.S. Cl. ................................. 174/153 G; 174/156; 248/56
[58] Field of Search ............ 174/65 G, 152 G, 153 G, 174/155, 156, 157; 16/2; 29/426.6; 248/56; 277/178; 339/103 B, 126 RS, 128, 141, 208; 24/115 R

[56] References Cited

U.S. PATENT DOCUMENTS

| | | | |
|---|---|---|---|
| 403,491 | 5/1889 | Smith | 174/155 |
| 1,139,748 | 5/1915 | Beatty | 174/157 |
| 1,505,730 | 8/1924 | Rockwell | 174/155 |
| 3,161,906 | 12/1964 | Yarm | 174/153 G |

Primary Examiner—Laramie E. Askin
Attorney, Agent, or Firm—Robert W. J. Ushe

[57] ABSTRACT

A bipartite cable fastener in which abutting faces of the respective parts are provided with complementary camming surfaces extending in orthogonal directions to center the body parts both axially and transversely during movement of the faces together. A laterally extending, mounting flange and detent shoulder are provided on each part in axially spaced relation for securing the fastener in a panel aperture, a socket for a release tool extending axially from one face to a location adjacent the shoulder and a stress relieving cavity being formed in the opposite face to extend axially between the socket and a cable.

10 Claims, 7 Drawing Figures

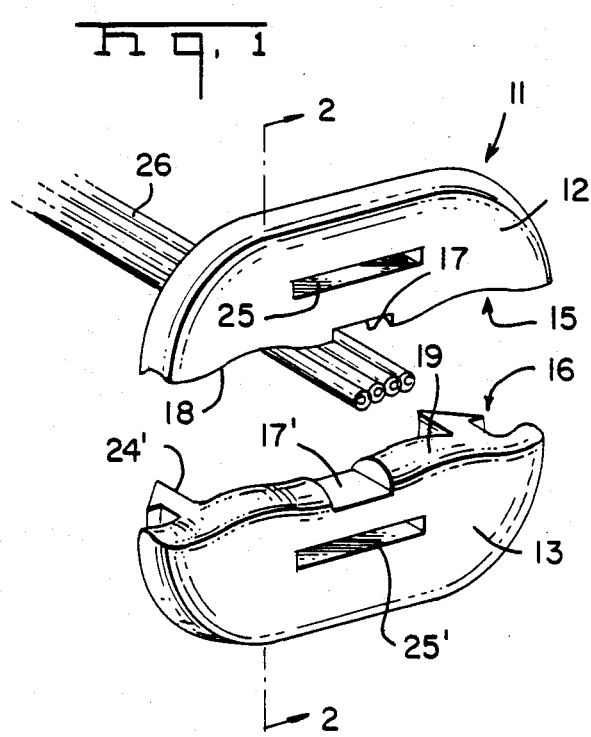
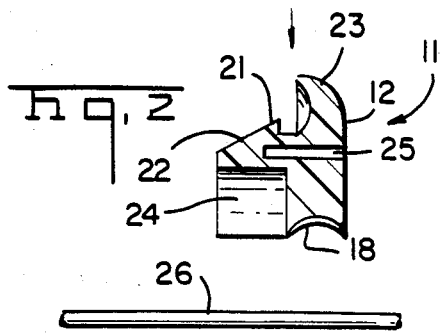
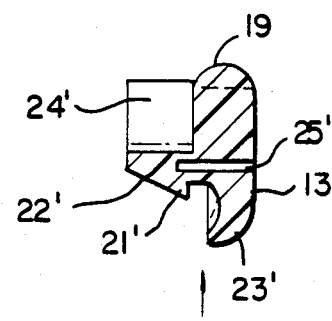
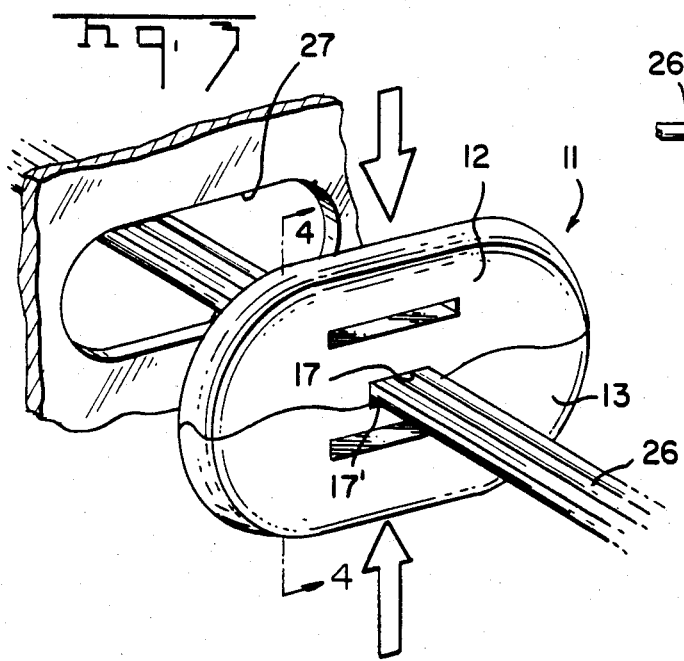
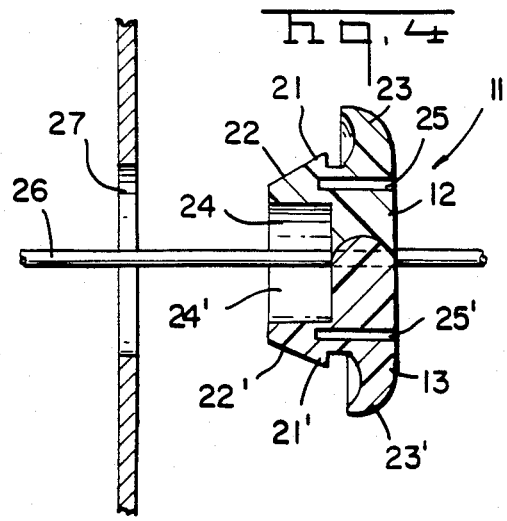

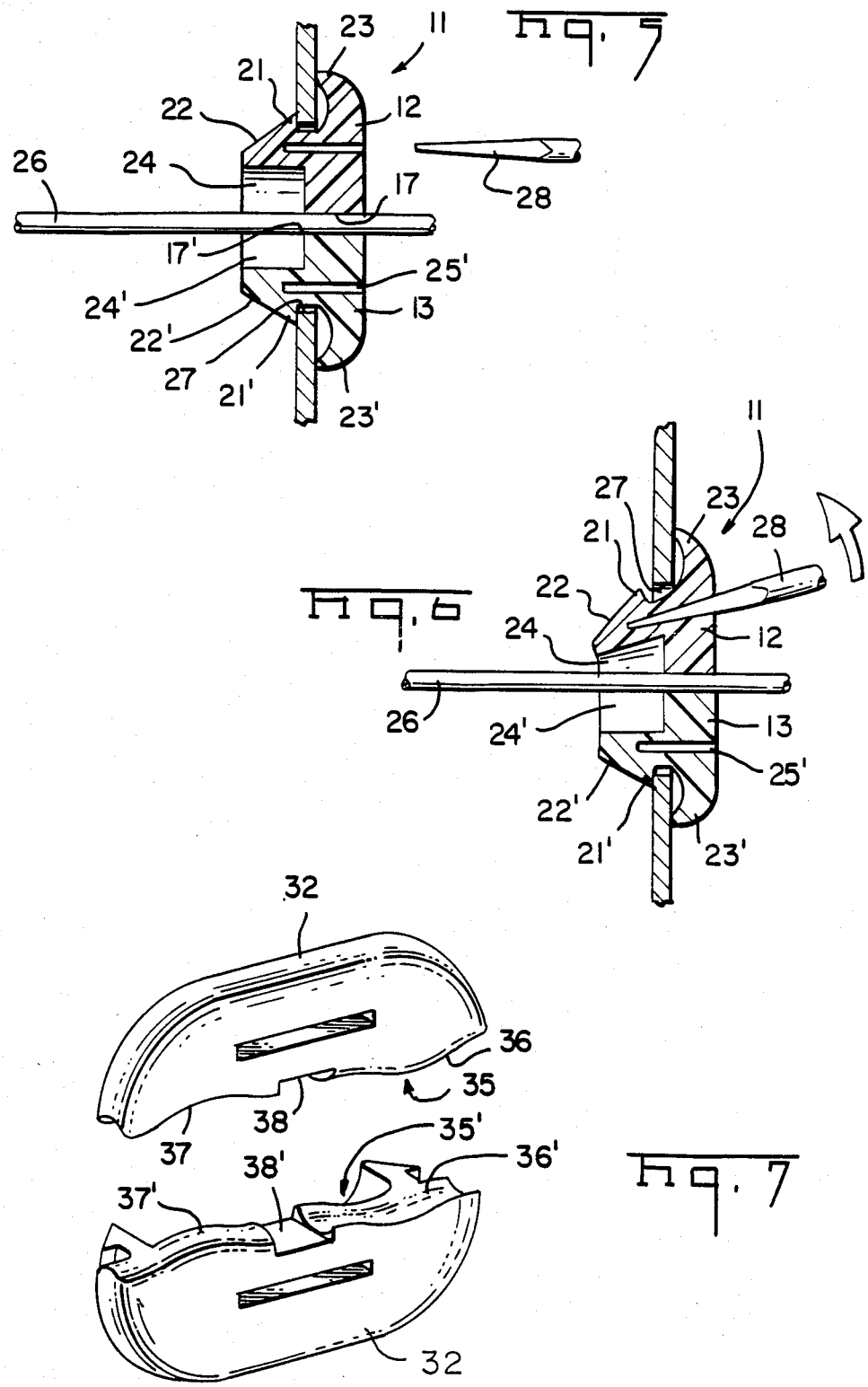

SELF-CENTERING CABLE FASTENER

The invention relates to cable fasteners and particularly to grommets for securing cables in panel apertures.

There is a requirement particularly in the automotive industry to provide fasteners such as grommets to secure harness cables in panel apertures. In view of the trend to the production of harnesses in modular form for installation as a single unit in the automobile, it is desirable that such fasteners can be readily assembled with the harness cable at required locations during fabrication of the harness prior to installation using mass production assembly line techniques.

With known bipartite fasteners that can be assembled around cables at intervals intermediate the cable ends, careful alignment of the parts must be maintained during their juxtaposition and movement together to ensure their accurate assembly. This requires relatively complex and large assembly tooling which is expensive to manufacture and maintain in view of the precise tolerances involved.

According to one aspect of the invention, a cable fastener comprises first and second body parts having first and second faces, respectively, movable into abutment transversely of the cable to confine the cable between them, the first and second faces being formed with complementary camming surfaces extending in orthogonal directions precisely to center the body parts both axially and transversely of the cable during such movement.

The self-centering provided throughout entire movement together of the parts by the interengagement of the camming surfaces on each part enables use of relatively simple and compact assembly apparatus with magazine feed that can readily be incorporated in an assembly line.

Preferably, the first and second body parts are identical, and complementary camming surfaces are formed on opposite sides of each face of each body part. This enables the fastener to be manufactured using only a single mould, minimizing tooling costs.

An additional requirement to be met in grommet design particularly for use in an adverse environment subject to vibration is the reliable retention of the grommet in the panel aperture together with ease of extraction from a face of the panel to permit servicing and repair of electrical equipment.

According to another aspect of the invention, a body part is provided with a laterally extending detent shoulder for securing the part in a panel aperture and an axially extending socket adjacent the detent shoulder for receipt of a lever-form release tool.

Preferably, the socket opens to a front face of the body and a stress-relieving cavity is formed in a rear face of the body between the socket and the axis.

The adaptation for receipt of a simple release tool such as a screwdriver facilitates ready release from the panel aperture without damage and enables the grommet body part to be moulded of a resilient material which is relatively stiff assuring reliable retention of the grommet in the panel aperture.

The stress relieving cavity facilitates the flexure of the grommet radially inwards at locations adjacent the rear face by pivotal movement of the release tool while permitting structural integrity to be maintained adjacent the front face, as the material is relatively incompressible.

Reference is hereby made to my pending application Ser. No. 517,617 of even date, the disclosure of which is incorporated herein by reference.

Examples of grommets according to the invention will now be described with reference to the accompanying drawings in which:

FIG. 1 is a perspective view of a bipartite grommet according to the invention with first and second members arranged for assembly with a cable;

FIG. 2 is a cross-sectional view taken along line 2—2 of FIG. 1;

FIG. 3 is a perspective view of the grommet after assembly and aligned for seating in a panel aperture;

FIG. 4 is a cross-sectional view taken along line 4—4 of FIG. 3;

FIG. 5 is a view similar to FIG. 4 after seating the grommet in a panel aperture;

FIG. 6 is a view similar to FIG. 4 during release by a tool; and

FIG. 7 is a perspective view of a preferred alternative example.

As shown particularly in FIGS. 1-6, in the first example of the invention, the grommet 11 is bipartite, each part 12, 13 being moulded from a suitably resilient material such as Mobay 110-07 R.I.M. of approximately 80 durometer. Mobay 110-07 R.I.M. is manufactured by Mobay Chemical Corporation of Penn-Lincoln Parkway West, Pittsburgh, Pa. 15205. The parts 12 and 13 have first and second faces 15 and 16, respectively formed centrally with axially extending cable-receiving recesses 17 and 17'. On each side of the recesses, the faces are formed with orthogonal smoothly undulating camming surfaces 18, 19, the surfaces on one face being complementary to the surfaces on the other face and extending for substantially the entire area of each face. In particular, the surface 18 is of concave cross-section in axially and perpendicularly extending planes and the surface 19 is of convex cross-section in those planes. Detent shoulders 21, 21' extend laterally along a periphery of each part 12, 13, respectively, and have frustoconical lead-in surfaces 22, 22' extending from rear faces. Mounting flanges 23, 23' extend laterally along the peripheries of the front faces. Hemispherical stress-relieving cavities 24, 24' are formed in each of the rear faces to extend axially forwardly beyond the detent shoulders, and blind sockets 25, 25' for a release tool extend axially rearwardly from the front face beyond and between the detent shoulders 21, 21' and the cavities 24, 24'.

To assemble the grommet, adhesive is applied to the respective faces and the parts are urged together about a cable 26 aligned with the cable-receiving recesses 17, 17'. As a result of the complementary camming surfaces 18, 19, any axial or lateral misalignment of the two parts will, within limits, be corrected during progressive engagement of the faces 15 and 16 so that the parts are precisely aligned when completely assembled.

The self-aligning or centering properties are particulary important as they enable the grommet to be assembled automatically with a cable using apparatus which does not need to be manufactured to close tolerances and can, therefore, be relatively simple, using magazine feed, and sufficiently compact to be accommodated in harness-making apparatus.

As shown in FIGS. 5 and 6, the grommet assembly is retained by the shoulders 21, 21' as a press fit in a panel structure 27 and release is achieved by inserting a screwdriver blade 28 into a socket and pivoting in the manner shown in FIG. 6 to lever the shoulder clear of the rim of the aperture, distortion of the material being facilitated by the cavity 24.

The provision of the release socket enables the grommet to be relatively stiff and incompressible ensuring the reliable retention of the grommet in a panel aperture even in an adverse environment subject to vibration, such as in an automobile, and enabling the grommet to be moulded from the relatively inexpensive reaction injection moulding material identified above.

In the preferred example shown in FIG. 7, the grommet parts 32, 32' are identical, the faces 35, 35' each comprising axially and laterally extending camming surfaces 36, 36' and 37, 37' of complementary convex and concave shape on respective opposite sides of a central cable receiving recess 38 or 38'. The identical shapes of both parts avoids a requirement for different moulds for each part, thus reducing tooling costs. Assembly and release from a panel aperture can be achieved in the same manner as with the previous example.

What is claimed is:

1. A cable fastener comprising first and second body parts having first and second faces, respectively, movable into abutment transversely of a cable to confine a cable between them, the first and second faces being formed with complementary, smoothly undulating, camming surfaces extending in orthogonal directions for substantially the entire areas of the faces precisely to center the body parts both axially and transversely of a cable during such movement.

2. A cable fastener according to claim 1 in which the first and second body parts are identical, and complementary camming surfaces are formed on opposite sides of each face of each body part.

3. A cable fastener according to claim 2 in which each body part is provided with a laterally extending mounting flange axially spaced from a laterally extending detent shoulder for securing the body parts in an aperture in a panel received between the mounting flanges and detent shoulders.

4. A cable fastener according to claim 1 in which each body part is formed with a laterally extending mounting flange axially spaced from a laterally extending detent shoulder for securing the body parts in an aperture in a panel received between the mounting flanges and detent shoulders.

5. A cable fastener according to claim 4 in which a body part is formed with an axially extending socket adjacent its detent shoulder for receipt of a lever-form release tool.

6. A cable fastener according to claim 5 in which the socket opens to a front face of the body part and a stress-relieving cavity is formed in a rear face of the body part between the socket and the axis.

7. A cable fastener according to claim 6 in which the socket extends axially rearwardly beyond the detent shoulder and the cavity extends axially forwardly beyond the detent shoulder.

8. A cable fastener comprising first and second, identical, body parts having first and second faces, respectively, movable into abutment transversely of a cable to confine a cable between them, complementary camming surfaces being formed on opposite sides of each face of each body part which surfaces extend in orthogonal directions precisely to center the body parts both axially and transversely of a cable during such movement, each body part being formed with a laterally extending mounting flange axially spaced from a laterally extending detent shoulder for securing the body parts in an aperture in a panel received between the mounting flanges and detent shoulders and each body part being formed with an axially extending socket adjacent its detent shoulder for receipt of a lever-form release tool.

9. A cable fastener according to claim 8 in which each socket opens to a front face of the respective body part and a stress-relieving cavity is formed in a rear face of each body part between the respective socket and the axis.

10. A cable fastener according to claim 9 in which each socket extends axially rearwardly beyond the respective detent shoulder and each cavity extends axially forwardly beyond the respective detent shoulder.

* * * * *